US008358298B2

(12) United States Patent
Lee et al.

(10) Patent No.: US 8,358,298 B2
(45) Date of Patent: Jan. 22, 2013

(54) AUTOMATIC BRIGHTNESS CONTROL

(75) Inventors: Kang Lee, San Jose, CA (US); Austin Park, Palo Alto, CA (US); David Timothy Robishaw, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 537 days.

(21) Appl. No.: 12/575,062

(22) Filed: Oct. 7, 2009

(65) Prior Publication Data
US 2011/0080422 A1    Apr. 7, 2011

(51) Int. Cl.
*G09G 5/10*    (2006.01)
(52) U.S. Cl. ......... 345/211; 709/206; 713/340; 345/690
(58) Field of Classification Search .............. 345/55, 345/60, 63, 76, 77, 87, 88, 89, 102, 204, 345/211, 212, 589, 690; 709/206; 713/300–340
See application file for complete search history.

(56) References Cited

U.S. PATENT DOCUMENTS

| | | | |
|---|---|---|---|
| 6,429,840 B1* | 8/2002 | Sekiguchi | 345/88 |
| 6,597,339 B1* | 7/2003 | Ogawa | 345/102 |
| 8,089,451 B2* | 1/2012 | Furuta | 345/102 |
| 2002/0082059 A1* | 6/2002 | Nariai et al. | 455/573 |
| 2005/0127879 A1* | 6/2005 | Sato et al. | 320/134 |
| 2005/0134230 A1* | 6/2005 | Sato et al. | 320/136 |
| 2006/0022899 A1* | 2/2006 | Johnson | 345/55 |
| 2006/0236144 A1 | 10/2006 | Chao | |
| 2007/0171218 A1* | 7/2007 | Hong et al. | 345/211 |
| 2007/0252552 A1 | 11/2007 | Walrath | |
| 2009/0077277 A1 | 3/2009 | Vidal et al. | |
| 2009/0109246 A1* | 4/2009 | Oh | 345/690 |
| 2009/0167671 A1* | 7/2009 | Kerofsky | 345/102 |
| 2009/0278827 A1* | 11/2009 | Yokoyama | 345/204 |

OTHER PUBLICATIONS

International Search Report and Written Opinion of the International Search Authority dated Feb. 2, 2011.
PCT/US10/49266 International Preliminary Report on Patentability and Written Opinion of the International Search Authority, Apr. 19, 2012.

\* cited by examiner

*Primary Examiner* — Tom Sheng
(74) *Attorney, Agent, or Firm* — Tucker Ellis LLP

(57) ABSTRACT

In an example embodiment disclosed herein is an apparatus, comprising a battery, a display, and logic coupled to the battery and display. The logic is configured to determine an amount of remaining energy in the battery, and a current power consumption rate of the apparatus. The logic determines whether the amount of remaining energy is sufficient to operate the apparatus for the duration of the predetermined time period based on the current power consumption rate of the apparatus. The logic is configured to adjust the brightness of the display to enable the device to operate for the duration of the predetermined time period responsive to determining the amount of remaining energy in the battery is insufficient to operate the apparatus for the duration of the predetermined time period based on the current power consumption of the apparatus.

21 Claims, 3 Drawing Sheets

US 8,358,298 B2

AUTOMATIC BRIGHTNESS CONTROL

TECHNICAL FIELD

The present disclosure relates generally to power management in portable devices.

BACKGROUND

Currently, Internet meeting software such as MeetingPlace and Webex, available from Cisco Systems, Inc., 170 West Tasman Drive, San Jose, Calif. 95134, are being developed for mobile devices to further increase productivity and accessibility. By using this software, users can join online meetings from anywhere they have mobile data or voice access. Many Internet meetings, however, require both video (for the web share) and voice capabilities, which together can use a large amount of power. Consequently, running such power-intensive applications can quickly drain the battery of the mobile device.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
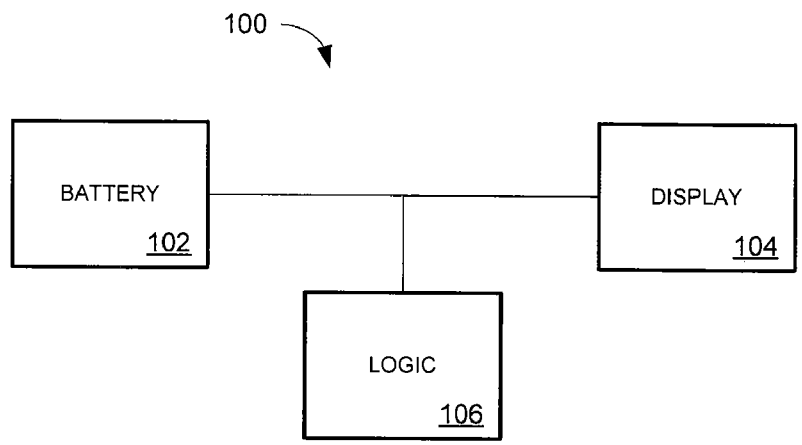
FIG. 1 illustrates an example of an apparatus with a display configured to implement an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embedment disclosed herein is an apparatus, comprising a battery, a display having a brightness set at an original level, and logic coupled to the battery and the display. The logic is configured to determine an amount of remaining energy in the battery. The logic is further configured to determine a current power consumption of the apparatus. The logic determines whether the amount of remaining energy is sufficient to operate the apparatus for a duration of a predetermined time period based on the current power consumption of the apparatus. The logic is configured to adjust the brightness of the display from the original level to a second level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus.

In accordance with an example embodiment, there is disclosed herein a method comprising determining an amount of remaining energy in a battery, and determining a current power consumption of an apparatus powered by the battery. The method further comprises determining whether the amount of remaining energy is sufficient to operate the apparatus for a duration of a predetermined time period based on the current power consumption of the apparatus. The brightness of the display is adjusted from an original level to a second level that is lower than the original level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus.

In accordance with an example embodiment, there is disclosed herein logic encoded on at least one tangible medium and when executed operable to determine an amount of remaining energy in a battery, and determine a current power consumption rate of an apparatus powered by the battery. The logic determines whether the amount of remaining energy is sufficient to operate the apparatus for a remaining duration of a predetermined time period based on the current power consumption rate of the apparatus. The logic is operable to output data indicating that the amount of remaining energy is insufficient to operate the apparatus for the remaining duration of the predetermined time period based on the remaining energy in the battery and the current power consumption of the apparatus responsive to determining the amount of remaining energy is insufficient to operate the apparatus for the duration of the predetermined time period based on the current power consumption of the apparatus. The logic is further operable to wait for data to initiate a power save mode responsive to determining the amount of remaining energy is insufficient to operate the apparatus for the duration of the predetermined time period based on the current power consumption of the apparatus. The logic adjusts the brightness of the display from an original level to a second level that is lower than the original level to enable the device to operate for the duration of the predetermined time period based on the amount of remaining energy in the battery and the current power consumption of the apparatus responsive to receiving the data to initiate a power save mode.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is provided a mechanism which preserves enough battery life for mobile meeting participants to stay in the full duration of the meeting. To accomplish this, logic in a battery powered device will calculate and compare the total remaining capacity of the battery with the amount of power required for finishing the meeting. If the remaining power is too low, the meeting software will dynamically adjust one or more of the controllable factors. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software which performs the functionality when executed by a processor.

There are many factors that impact the power consumption of the device: screen brightness, signal strength, background tasks, etc. In an example embodiment, screen brightness is adjusted to decrease power consumption of the device.

In an example embodiment, logic (for example embodied in Internet meeting software on a mobile device) provides a scheduled start time and end time for each meeting. Therefore, the meeting duration can be calculated. An estimate for the remaining energy for the device, and an estimate of the current power consumption rate can be calculated. If available, these calculations can be obtained from the Operating System (OS), however, any suitable algorithm can be employed. For example, if the amount of remaining energy is sampled at several points in terms of time, a least square fit line can be generated such as $E(t)=Pt+E(t0)$ where P and $E(t0)$ are the slope (current power consumption rate) and intercept of the linear regression. With this data, an estimate of how long the battery will last given the current power consumption rate can be calculated.

The following symbols are used in the power and energy calculations described herein:

TotalRemainingEnergy=total remaining energy in the battery;

CurrentPowerConsumption=current power consumption rate of the device;

ControllablePowerConsumption=controllable power consumption rate required to finish the meeting;

Fixed PowerConsumption=power consumption rate by uncontrollable factors;

BatteryDuration=duration the battery will last with the current power consumption rate;

RemainingMeetingDuration=scheduled remaining meeting duration;

Using the TotalRemainingEnergy and CurrentPowerConsumption, the BatteryyDuration can be computed. If the BatteryDuration is smaller than the RemainingMeetingDuration, the controllable factors are adjusted to obtain a suitable level of ControllablePowerConsumption. Since this calculation is rough and may not be completely accurate because of the uncertainty of power consumption, it should be calculated periodically and the controllable factors should be readjusted accordingly. The following pseudo code illustrates an example where a recalculation is performed at 60 second intervals:

```
For each 60 seconds {
    BatteryDuration = Total RemainingEnergy / CurrentPowerConsumption
    if (BatteryDuration < Remaining MeetingDuration)
        {ControllablePowerConsumption = (TotalRemainingEnergy –
    FixedPowerConsumption × RemainingMeetingDuration) / RemainingMeetingDuration}
        adjust screen brightness to achieve ControllablePowerConsumption}}
```

For example, when a user joins a meeting, the software begins calculating every 60 seconds whether the user can finish the meeting. The first time the application determines the power consumption rate is too high, the user will get the following prompt:

The battery is too low to complete the meeting.
1. Enter power saving mode.
2. Continue with the current settings.

If the user chooses option 1, the program will enter power saving mode and begin applying the users predetermined power saving options. In an example embodiment, this power saving option is the screen brightness level. Note that a means should be provided for users to temporarily exit the power saving mode, for example if the user wants to perform another task while the meeting is in progress. In an example embodiment, if the battery is so low that it cannot finish the meeting even with all of the controllable factors adjusted, the user will get an additional warning telling them approximately how much time they have remaining.

The following provides an example scenario that employs the principles of an example embodiment. John, Sam and James all join a one hour meeting via their mobile devices. John has a full battery. He joins the meeting and completes it as normal. Sam's battery is running low, and he has enough energy to remain in the meeting for about 30 minutes at its current consumption rate. When Sam joins the meeting, he is prompted, asking whether he would like to enter power saving mode. He chooses to save power, so his screen dims. Halfway through the meeting, Sam wants to check his email, and temporarily exits the power saving mode. When he returns to the meeting, he resumes the power saving mode. With about 10 minutes remaining, Sam finds a power supply and begins to charge his phone; the phone exits the power saving mode and Sam finishes the meeting. James' battery is almost dead. When he joins the meeting, he is told that he cannot complete the meeting, and will only be able to join for 10 minutes. However, if he enables the power saving options he will be able to join for approximately 30 minutes. James enables power saving mode and his phone ends up dying halfway through the meeting. In an example embodiment, the meeting software is allowed to disable some software such as IM and email during the meeting and this could be given to the mobile meeting participant as an option to reduce power consumption rate.

In an example embodiment, a meeting application (logic) can provide an early warning if the amount of energy in a battery is insufficient before a meeting begins. For example, the meeting application running in a mobile device can start monitoring the amount of energy remaining in a battery when it is notified that a meeting (or meetings) is scheduled for the user. Some time before a scheduled meeting start time, the meeting application checks if the user can complete the scheduled meeting with the current battery level. If the meeting application determines that the remaining energy in the battery is insufficient, the meeting application displays a warning, for example: Sam has a scheduled meeting at 2:00 PM for 1 hour and at 1:00 PM his iPhone—and the Meeting-Place application found the current battery level is not high enough to complete the meeting. Thus the meeting application displays a warning message on the screen, "You may not be able to complete the meeting scheduled at 2:00 PM if you join it with this device. If you want to join the meeting with device, you will need to charge the battery of this device to complete it."

In an example embodiment, in addition to early warning, the meeting app can optionally propose early power management to the user. In this mode, early automated brightness control and/or other power saving options are employed with respect to the scheduled meeting end time. For example, if at 1:00 PM a meeting application determines that it needs to start early automated brightness control for Sam to complete the meeting scheduled at 2:00 PM, the application prompts the user if it can start the power saving mode. If the user selects yes, the power management mode kicks in.

In an example embodiment, if the user ignored the early warnings or could not find a battery charger even with the early warning or early power management, the next thing the meeting application can do is request early hibernation. At a preconfigured time before a meeting (but later than the early warning or early power management), the meeting application decides if a certain amount of hibernation will enable the device to complete the meeting. If the application determines a certain amount of hibernation will enable the device to complete the meeting, the application prompts the user. If the user selects to hibernate, the application hibernates until either the expiration of the certain amount of time to hibernate that was calculated or until the scheduled meeting start time. For example, Sam's iPhone MeetingPlace application found that 30 minutes of hibernation before the meeting start time is required to complete the meeting. Thus the application prompts Sam, "In order to complete the meeting scheduled at 2:00 PM, this device needs to hibernate by 2:00 PM. Do you want to hibernate? [yes|no]." Sam chooses yes and the device enters hibernate mode and wakes up at 2:00 PM.

In an example embodiment, the meeting application can notify meeting participants of a potential early departure from a scheduled meeting and/or optionally reschedule the meeting. For example, if the user ignored all the early warnings, the meeting application can notify the other invitees via any notification mechanism such as email or voice mail regarding a potential early departure from the meeting due to power shortage. If the user is the meeting host, he can optionally reschedule it. For example, if Sam has the same meeting at 2:00 PM and ignored all the power management options so far, 5 minutes before the meeting, the meeting application in his mobile phone prompts him by asking "If you join the meeting scheduled meeting at 2:00 PM with this device, you will leave the meeting at around 2:40 PM due to power shortage. Do you want to notify this to the meeting invitees? [yes|no]." If Sam chooses yes, the device retrieves invitee list and sends an email to the invitees. As another example, if James is the host of the meeting at 2:00 PM and the meeting application in his personal digital assistance (for example a BLACKBERRY) notifies him that he will be able to attend the meeting until 2:40 PM due to power shortage. Since James is the meeting host, the meeting application prompts him, "If you join the meeting scheduled at 2:00 PM, you will be able to attend it only for around 40 minutes because the battery is running out in this device. Do you want to reschedule this meeting duration from 1 hour to 40 minutes? [yes|no]." If James chooses yes, the meeting is rescheduled as 40 minutes meeting.

In an example embodiment, when a user joins his meeting from a mobile device with low battery levels, the meeting application provides an option for the user to manually adjust the brightness of the screen or turn off certain features. As the user adjusts its brightness or turns off some features, the device displays the expected meeting attendance time with the current settings. Note that if the user decides not to choose manual adjustment, the automated brightness control mode starts.

In an example embodiment, screen brightness is adjusted responsive to screen sharing during a meeting. For example, when power is low in a mobile device, the screen brightness is also very low (nearly dark) to save power when nothing is shared (and when there's no input detected on the user interface). When the screen is shared among meeting participants, the screen is adjusted to be brighter. When screen sharing ends, power savings mode resumes.

In an example embodiment, meeting participants may be notified before departure, for example when a user is forced to leave a meeting due to insufficient power. For example, right before the battery dies, the meeting application can send notification to the other meeting participants regarding when and why the user departs from the meeting. Optionally, the meeting application can send notification after it is recharged and booted back up if it didn't send notification before losing power.

In an example embodiment, the meeting application may automatically detect and notify a user of meeting minutes or a recording if the user left the meeting due to a power shortage. For example, the meeting application, after the device is recharged and restarted, can query meeting server to find any useful resources such as meeting minutes or recording for the meeting. If the resources are found, the meeting application can notify a user that the user can retrieve any missed information from the found locations and provide the user with the option to retrieve (e.g. download) the information.

FIG. 1 illustrates an example of an apparatus 100 powered by battery 102 with a display 104 configured to implement an example embodiment. Logic 106 is coupled to battery 102 and display 104. Logic 106 is configured to determine an amount of remaining energy in battery 102. Logic 106 is also configured to determine a current power consumption of the apparatus 100. Logic 106 determines whether the amount of remaining energy in battery 102 is sufficient to operate apparatus 100 for a duration of a predetermined time period based on the current power consumption of apparatus 100. Logic 106 adjusts the brightness of display 104 from the original level to a second level to enable the device to operate for the duration of the predetermined time period based on the amount of remaining energy in battery 102 and the current power consumption of the apparatus 100 responsive to determining the amount of remaining energy is insufficient to operate apparatus 100 for the duration of the predetermined time period based on the current power consumption of the apparatus. For example, if apparatus 100 is being used to attend a meeting, for example by providing audio, visual and/or audiovisual signals, logic 106 determines the amount of time remaining for the meeting and whether the battery has sufficient energy to last the remainder of the meeting. If the battery does not have sufficient energy, logic 106 adjusts the brightness of display 104 to reduce the power consumption of apparatus 100 in order to extend the life of battery 102.

In an example embodiment, logic 106 adjusts the brightness of the display based on a controllable amount of power consumption which is the difference between the current power consumption and a rate of power consumption by uncontrollable factors. For example, $$BatteryDuration=TotalRemainingEnergy/CurrentPowerConsumption; and$$

$$\{ControllablePowerConsumption=(TotalRemainingEnergy-FixedPowerConsumption \times RemainingMeetingDuration)/RemainingMeetingDuration.$$

Display 104 is adjusted to achieve ControllablePowerConsumption.

In an example embodiment, logic 106 is further configured to periodically recalculate the amount of remaining energy in the battery and current power consumption. For example, these calculations may be performed every sixty seconds.

Figure 2:
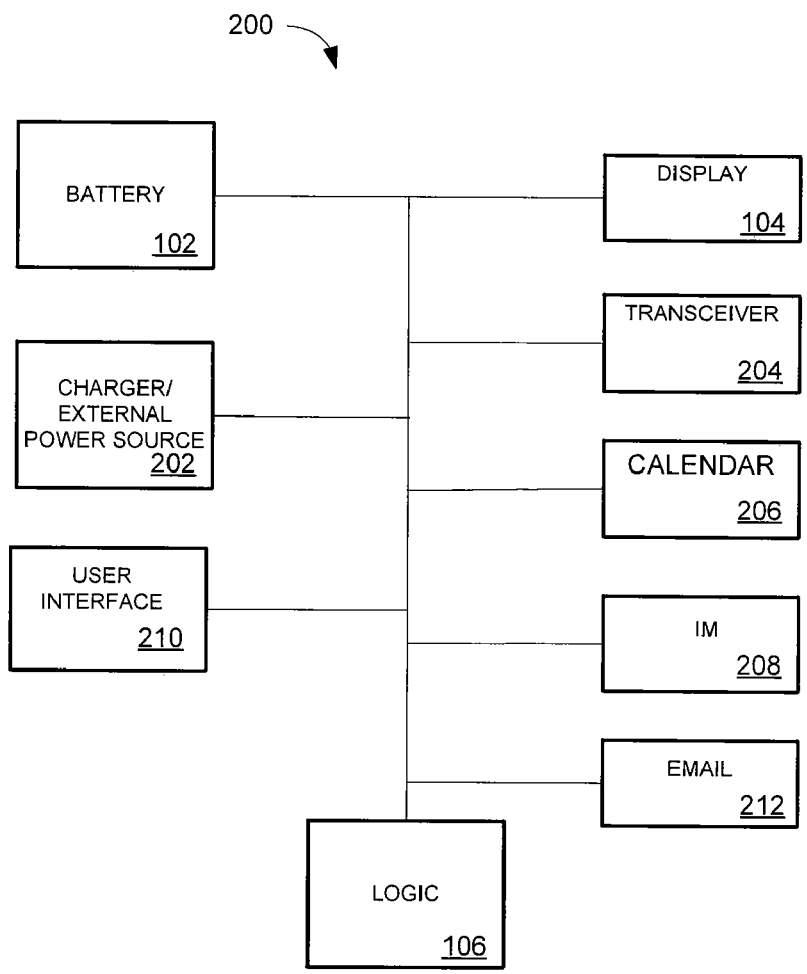
FIG. 2 illustrates an example of an apparatus with a display and other controllable power features upon which an example embodiment may be implemented.

In an example embodiment, apparatus 100 further comprising a user interface, which may be embodied in display 104 or part of which is implemented by an external device (not shown, see e.g. 210 FIG. 2). For example, display 104 provides output to a user. In particular embodiments, display 104 is configured with touch screen capabilities. In yet other example embodiments, the user interface may suitably comprise an audio output as well as keypad, mouse, audio or optical inputs (not shown, see e.g. 210 FIG. 2).

In an example embodiment, logic 106 is configured to adjust the brightness of display 104 to the original level responsive to detecting activity on the user interface. Logic 106 may be further configured to adjust the brightness of display 104 to the second level upon determining activity at the user interface has ceased. For example, if a user of apparatus 100 starts a new application, logic 106 adjusts the brightness of the display to the original level while the new application is running. Logic 106 adjusts the brightness of the display to the second level upon determining the new application has terminated.

In an example embodiment, logic 106 is further configured to determine whether there is sufficient energy in the battery for a future scheduled event based on current consumption. For example, logic 106 may interact with a calendaring/meeting application and determine whether any future meetings are scheduled within a certain time period (for example by the end of the business day or end of the day). If there are meetings scheduled and logic 106 determines that based on the current power consumption the remaining energy in battery 102 is insufficient to last through the scheduled future event (e.g. meeting), logic 106 is further configured to output a message on the user interlace (such as display 104) responsive to determining that battery has insufficient energy for the future scheduled event. The message may further include instructions for responding to indicate whether the user desires to enter power savings mode in advance of the scheduled event to insure there is sufficient battery energy to complete the meeting. If the user inputs a response indicating that a power save mode is desired, logic 106 adjusts the screen brightness to a lower level prior to the future scheduled event responsive to an input received on the user interface.

In an example embodiment, if after entering a power save mode (e.g. by dimming display 104) logic 106 determines that the remaining energy of the battery is still insufficient to complete the scheduled event (or the duration of the predetermined time period), logic 106 outputs a warning (for example displays a warning on display 104) responsive to determining that the remaining energy of the battery is insufficient for the duration of the predetermined time period after adjusting the display to the lower level.

In an example embodiment, apparatus 100 is configured to communicate with other devices (not shown, see e.g. FIG. 2).

In particular embodiments, logic 106 is configured with meeting logic (for example meeting software) allowing a participant to bi-directionally communicate audio, video, and/or audiovisual with at least one other meeting participant. Logic 106 may determine the scheduled time period for a meeting from data acquired from either a calendaring application and/or a meeting application.

In an example embodiment, logic 106 comprises meeting logic (e.g. software) that enables screen sharing among meeting participants. Logic 106 upon detecting that a shared screen is being employed during the meeting adjusts display 104 to the original (bright) setting while the screen is being shared. Logic 106 adjusts display 104 to the second (lower) brightness setting responsive to screen sharing terminating.

In an example embodiment, logic 106 is configured to communicate with at least one other meeting participant for a scheduled meeting. For example, logic 106 may send an email, a voice mail, a short message service (SMS) message, and/or an instant message (IM) to the at least one other meeting participant responsive to determining the battery does not have sufficient energy to complete a scheduled meeting. For multiple participants, different types of messages may be sent (e.g. a SMS message to a first participant, an IM to a second participant, etc.). In particular embodiments, logic 106 is further configured to reschedule the scheduled meeting responsive to determining the battery does not have sufficient energy to complete a scheduled meeting. This feature may be limited to the host of the meeting or allow any participant of a meeting to reschedule. For example, the time of the meeting may be changed (such as the meeting is rescheduled to earlier time allowing apparatus 100 to complete the meeting) or the duration of the meeting can be changed (for example if the meeting is an hour long but battery 102 can only last for 35 minutes then the duration of the meeting can be changed to 35 minutes).

In an example embodiment, logic 106 adjusts the brightness of display 106 to the original level responsive to determining the battery 102 is charging and/or apparatus 106 is receiving power from an external source. In other embodiments, which will be further illustrates in additional examples embodiments described herein, logic 106 may change other settings along with dimming the brightness of display 104. For example, logic 106 may disable transceivers (such as a third generation cell phone "3G", WiFi, and/or Bluetooth transceivers) which are not being employed for a scheduled event such as a meeting. Other examples include disabling applications such as electronic mail, instant messaging (IM), SMS messaging, etc. Still other, examples include extending the polling time of applications such as calendaring or electronic mail.

FIG. 2 illustrates an example of an apparatus 200 with a display 104 and other controllable power features upon which an example embodiment may be implemented. In the example embodiments illustrated by FIG. 2, logic 106 can adjust the brightness of display 104, and may also perform other measures to limit the power consumption of apparatus 200 responsive to determining the energy remaining in battery 102 is insufficient to last for a predetermined time period based on current power consumption. As used herein, while logic 106 is limiting the power consumption by adjusting the brightness of display 104 and/or implementing other measures to save power, apparatus 200 (and logic 106) is said to be operating power save mode.

In an example embodiment, a charger and/or external power source 202 is coupled to battery 102. When logic 106 detects that charger 202 is charging battery 102, or power is being provided by an external power source 202, logic 106 can exit power save mode and restore display 104 to its original setting as well as activating or restoring any other device or application that whose operation was changed to limit power consumption. In particular embodiments, power may also be received via transceiver 204. For example, if transceiver 204 is a wired transceiver and coupled to an Ethernet port, apparatus 200 may be provided with Power over Ethernet (PoE). In these embodiments, logic 106 may exit power save mode.

In an example transceiver 204 is used to communicate with other devices. Transceiver 204 is suitably configured to employ any wired or wireless communication protocol to effect such communication. For example, transceiver may be a wireless transceiver capable of communicating with an access point and/or other wireless devices. In other embodiments, as mentioned herein supra, transceiver 204 may be a wired transceiver. In an example embodiment, transceiver 204 may comprise several transceivers. For example, transceiver 204 may comprise a 3G transceiver, a WIFI transceiver, a BLUETOOTH transceiver and/or a combination of the aforementioned transceivers. Logic 106 may power down or limit the power consumption of any or all transceivers forming a part of wireless transceiver 204 while in power save mode.

In an example embodiment, apparatus 200 comprises a calendar application 206, an Instant Messaging (IM) application 208, and/or a electronic mail (email) application 212. These applications may be embodied in logic as described herein. In an example embodiment, logic 106 is operable to disable any one, combination, or all of applications 206, 208, 212 while in power save mode. In yet other example embodiments, logic 106 is operable to extend the polling time (the time period in which the application checks for new messages) of any one, combination, or all of applications 206, 208, 212 while in power save mode. In still yet other example embodiments, logic 106 may extend the polling times of some of applications 206, 208, 212 while disabling some of applications 206, 208, 212, and adjusting the brightness of display 104 while in power save mode.

In an example embodiment, logic 106 can ascertain from calendar 206 future events, or the duration of a current event (such as a meeting). For example, based on data stored in calendar 206, logic 106 can determine that the user is currently scheduled for a meeting for one hour. Logic 106 determines whether the battery has sufficient energy based on the current power consumption to last for the remainder of the meeting. If not, logic 106 can either automatically begins power save mode or may output a prompt on display 104 or may provide other output such as an audio output. Logic 106 can wait for an input via user interface 106, which may be any suitable type of data input mechanism such as a keypad, mouse, optical or audio input device. In an example embodiment, display 104 may be a touch screen display enabling user input to be received via the touch screen (user interface 210 may or may not be present in this embodiment).

In particular embodiments, logic 106 may look for future scheduled events in calendar 206 and determine whether battery 102 has sufficient energy to last through the future scheduled event. If battery 102 does not have sufficient energy, then logic 106 may enter power save mode (either automatically or by prompting a user via display 104 and/or user interface 210) prior to the scheduled event.

Figure 3:
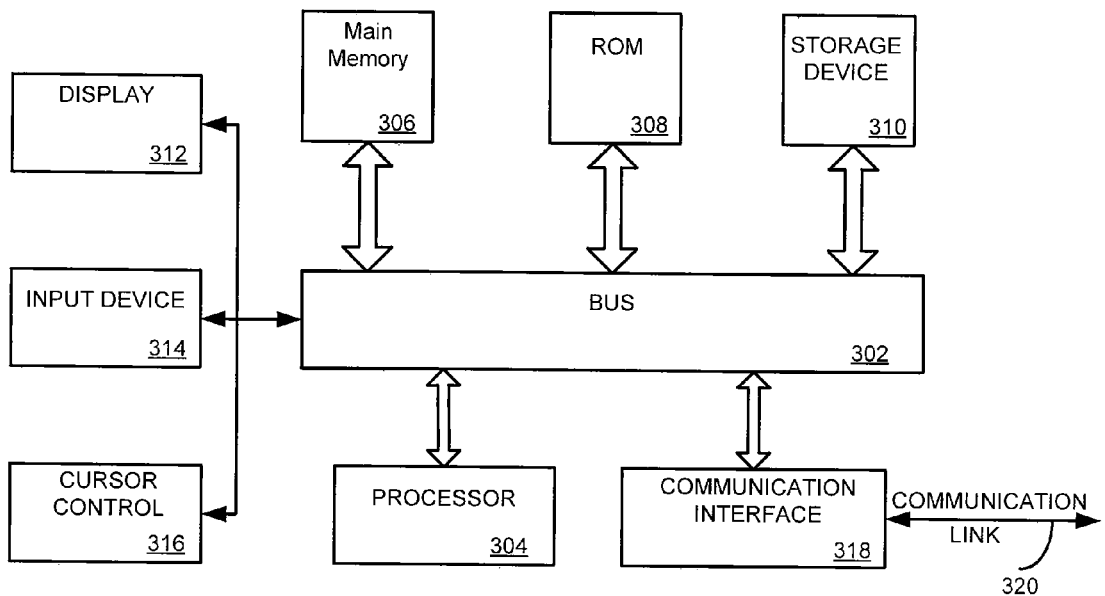
FIG. 3 illustrates an example of a computer system upon which an example embodiment may be implemented.

FIG. 3 illustrates an example of a computer system 300 upon which an example embodiment may be implemented. Computer system 300 is suitable for implementing the functionality described herein for logic 106 (FIGS. 1 and 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 such as a cathode ray tube (CRT) or liquid crystal display (LCD), for displaying information to a computer user. An input device 314, such as a keyboard including alphanumeric and other keys is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g. x) and a second axis (e.g. y) that allows the device to specify positions in a plane.

An aspect of the example embodiment is related to the use of computer system 300 for automatic brightness control. According to an example embodiment, automatic brightness control is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to a communication link 320 that is connected to a local network 322. For example, processor 304 may be executing meeting software and communicating with other meeting participants via communication link 320 through communication interface 318.

Figure 4:
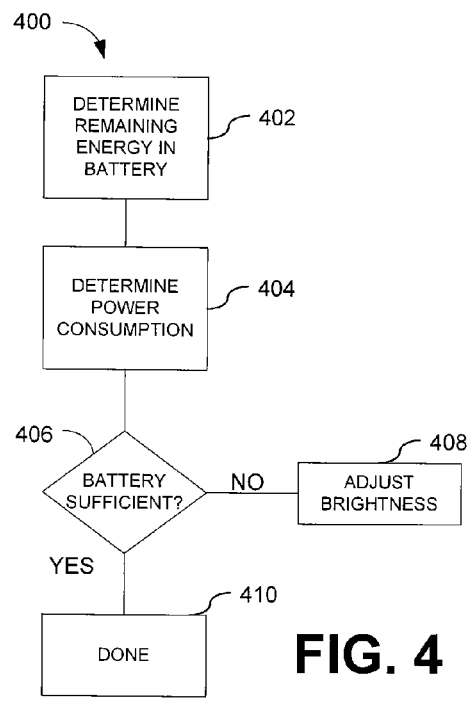
FIG. 4 illustrates an example methodology that adjusts a display screen of an apparatus to implement power savings.
Figure 5:
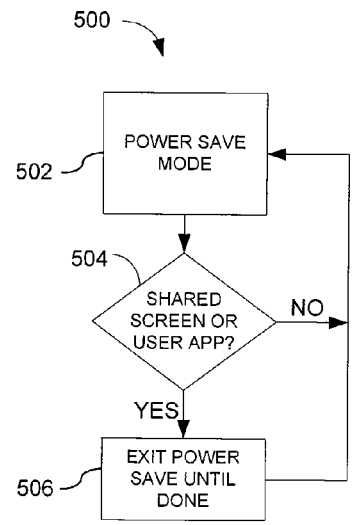
FIG. 5 illustrates an example of a methodology where power save mode is exited responsive to certain events.
Figure 6:
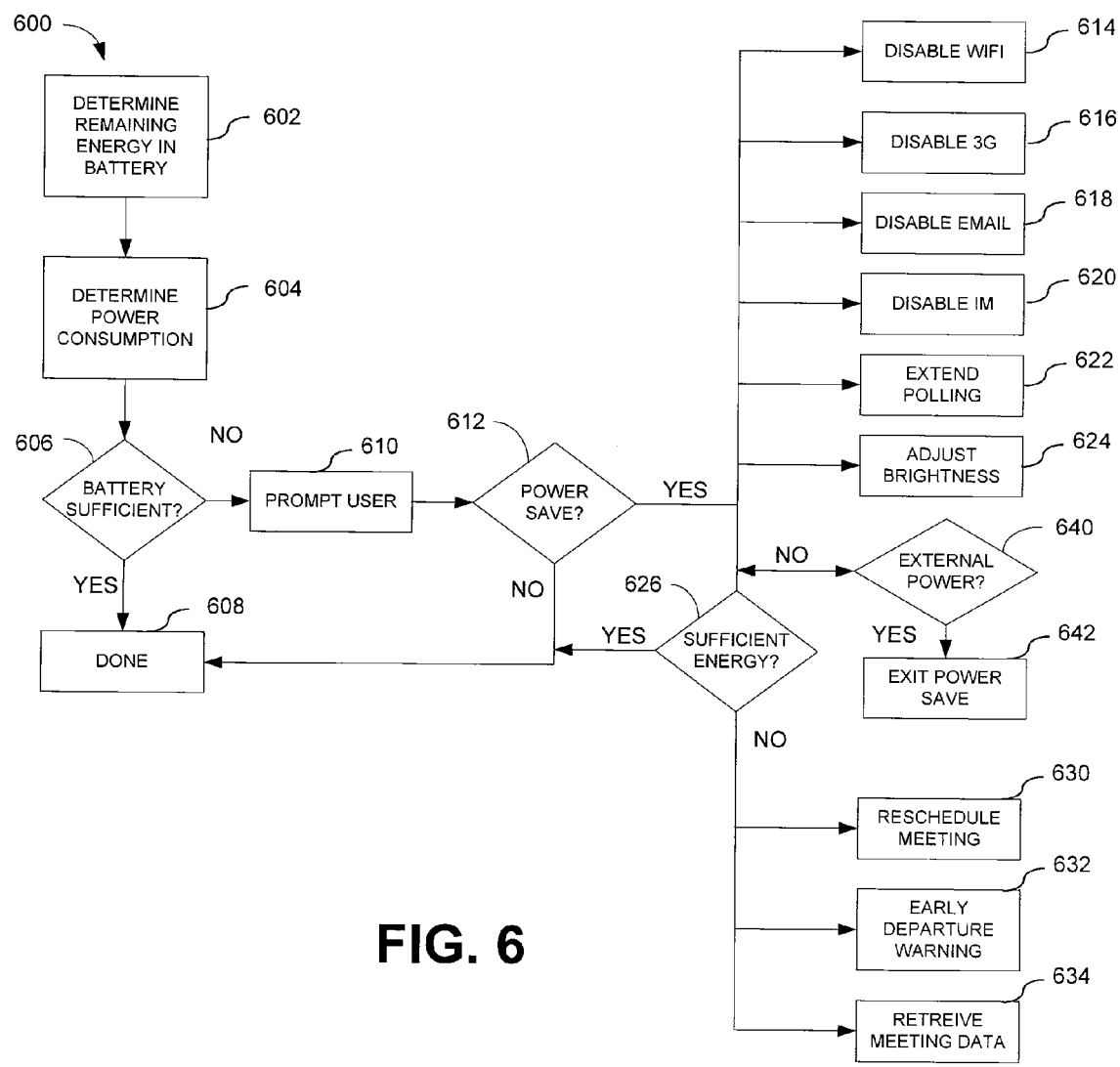
FIG. 6 illustrates an example of a methodology to implement power savings on a device with a display and other controllable power features.

In view of the foregoing structural and functional features described above, methodologies in accordance with example embodiments will be better appreciated with reference to FIGS. 4-6. While, for purposes of simplicity of explanation, the methodologies of FIGS. 4-6 are shown and described as executing serially, it is to be understood and appreciated that the example embodiment are not limited by the illustrated order, as some aspects could occur in different orders and/or concurrently with other aspects from that shown and described herein. Moreover, not all illustrated features may be required to implement the methodologies described herein in accordance with an aspect of an example embodiment. The methodologies described herein are suitably adapted to be implemented in hardware, software, or a combination thereof.

FIG. 4 illustrates an example methodology 400 that adjusts a display screen of an apparatus to implement power savings. Methodology 400 may be implemented to attempt to insure that a battery powered device has sufficient capacity to last for a predetermined time period, or for the remaining duration of the predetermined time period.

At 402, the amount of energy remaining in a battery is of a battery powered device determined. Some example embodiments include more than one battery.

At 404, the current power consumption of the battery powered device is determined. Those skilled in the art should readily appreciate that 402 and 404 may be implemented in any order or may be implemented concurrently.

At 406, it is determined whether there is sufficient energy remaining in the battery to power the device for a predetermined time period. The predetermined time period may be a future scheduled event, or the duration of time remaining on a current event (for example if currently attending an hour long meeting, how much longer should the meeting last). If at 406, the battery has sufficient energy (YES) then no further action needs to be taken as illustrated by 410 (done).

If, however, at 406, it is determined that there is insufficient energy remaining in the battery (NO), the brightness of a display associated with the device is adjusted at 408. In an example embodiment, the brightness is based on the amount of remaining energy, the power consumption of devices and/or applications which cannot be controlled, and the power consumption of devices that can be controlled. The brightness of the display is adjusted so that the device may complete the scheduled event. If, even after adjusting the brightness of the display, power consumption is still too high to complete the scheduled event, a warning may be issued to the user of the device and/or sent to other participants of the event, such as participants at a meeting.

In accordance with an example embodiment, the test for whether the battery has sufficient energy for an event may be implemented for future scheduled event. If the battery has insufficient power, then the device may enter into a low power state (and accordingly adjust the screen brightness) before the scheduled event and/or enter into a hibernation state before the scheduled event to attempt to insure the battery has sufficient energy to power the device throughout the scheduled event.

In an example embodiment, a user may be prompted with the option to enter into a low power state. If the user elects not to enter the low power state the screen will remain at normal brightness. If, however, the user elects to enter the low power state, the display brightness may be dimmed at that time at an intensity appropriate for the time dimming commences.

FIG. 5 illustrates an example of a methodology 500 where power save mode is exited responsive to certain events. Power save mode may have been implemented responsive to determining a battery has insufficient energy to power a device for a predetermined time period as illustrated herein in FIG. 4.

At 502, the device is in power save mode. While in power save mode, the brightness of a display associated with the device is dimmed. The amount of dimming may be dependent upon on how much energy remains in the battery and how much (the duration) of the predetermined time period remains.

At 504, which may be executed periodically or be event driven, a determination is made whether a new application (or an application using normal display intensity) is being executed (for example initiated by a user of the device) or whether screen sharing is in progress. For example, if the device is being employed for a meeting application where meeting participants communicate via audio, visual and/or audiovisual streams, the meeting application determines the users are 'sharing a screen' (for example a first meeting participant is displaying a document for all of the other meeting participants). If, at 504, it is determined that no application is using the display at full intensity or the screen is not being shared, the device remains in power save mode at 502.

If, at 504, it is determined that the device is executing a new application, an application using the display at full brightness (for example if a meeting is in progress and the user is running a second application, the screen may return to full brightness if the second application is waiting for user input), and/or the screen is being shared among participants of a meeting, at 506 the device exits power save mode. The device exits power save mode until the application is completed and/or shared screen is completed. The device then resumes power save mode at 502.

FIG. 6 illustrates an example of a methodology 600 to implement power savings on a device with a display and other controllable power features. In an example embodiment, the device is a battery powered device where it is desired to insure the device can operate for a predetermined time period. For example methodology 600 may be implemented by logic 106 (FIGS. 1 and 2) or by processor 304 (FIG. 3.

At 602, the energy remaining in a battery (or batteries) powering the device is determined. At 604, the current power consumption of the device is determined. As those skilled in the art can readily appreciate, 602 and 604 may occur in any order and/or concurrently.

At 606, it is determined whether the battery has enough energy to provide power to the device for a predetermined time period (or the remaining duration of the predetermined time period if an event is already in progress). As noted herein, the event maybe a scheduled event the device is currently performing, for example a meeting, and/or the time period may be for a future event (for example if its 1:00 and 1 hour meeting is scheduled for 2:00, a determination may be made whether the battery has sufficient power based on the current power consumption, and in particular embodiments the anticipated power consumption during the scheduled event to power the device until the end of the scheduled event). If at 606, it is determines that there is sufficient energy in the battery (or batteries), then nothing needs to be done as illustrated by 608 and the method is terminated although the method may be periodically triggered and restarted again either at a predetermined time interval or based on a triggering event.

If at 606, it is determined that the battery power is not sufficient to complete the scheduled event (e.g. a scheduled meeting), at 610 the user of the device is prompted as to whether they wish to enter a power save mode. The user may be prompted by an audio, visual and/or audiovisual signal. The user responds to the input. The response may be audio, visual, or via an input device such as a keyboard, mouse, pointing device and/or touch screen.

If at 612 it is determined whether the user requested a power save mode (or whether to automatically enter power save mode). If the user decided not to enter power save mode (NO), then processing is terminated at 608. Note that methodology 600 may be executed periodically, thus the user be prompted again at a future time whether to enter a power save state.

If at 612, the user consented to the power save state, or an automatic power save is in effect (YES), as will be described herein infra, one of or a combination of 614, 616, 618, 620, 622, 624, 626, 630, 632, 634 may be implemented. For example, one of or a combination of Disable WIFI 614, Disable 3G 616, Disable Email/Calendaring 618, Disable IM 620, Extend Polling for Email, Calendaring and/or IM 622 may be implemented along with adjusting display brightness to reduce power consumption.

At 626 it is determined whether power consumption has been reduced enough for the device to operate throughout the predetermined time period (or the remaining duration of the time period). If power consumption was sufficiently reduced and the battery (or batteries) have sufficient energy to enable the device to operate throughout the predetermined time period (YES), then methodology 600 is done as illustrated by 608. Because power consumption of the device may fluctuate and/or the calculations may not be sufficiently accurate, methodology 600 may be re-executed after a predetermined time period to verify the battery still has sufficient energy.

If at 626 it is determined that the battery still does not have sufficient energy (NO), one of or a combination of reschedule meeting 630, early departure warning 632, and/or retrieve meeting data 634 may be implemented. For example, if implementing reschedule meeting 630, if the user of the device is a host of a scheduled meeting, the meeting may be rescheduled (with or in at least one embodiment without consent of other meeting participants). For example, the meeting may be scheduled to terminate earlier to correspond with the expected time that the battery will no longer be able to power the device.

If early departure warning 632 is implemented, the device may automatically send a message to other participants of the scheduled event (for example a meeting) to notify them the user will be unavailable. The message may be sent via email, IM, SMS text, etc. The message may be sent just before the device runs out of power, or may be sent earlier such as at the beginning of the scheduled event or even before the scheduled event.

In an example embodiment, retrieve meeting 634 is performed after the device reboots. For example, after the device's battery is charged, a new battery is inserted, or the device is coupled to an external power source. This will allow a user to be able to retrieve meeting minutes and/or recordings (such as audio, visual and/or audiovisual) of the meeting.

At 640, a determination is made whether the device is receiving power form an external power source (for example the battery is coupled to a charging unit). If the device is not receiving external power (NO), the power save mode continues. If, however, at 640, an external power source is detected (YES), at 642 power save mode is exited.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a battery;
    a display having a brightness at an original level;
    logic coupled to the battery and the display;
    wherein the logic is configured to determine an amount of remaining energy in the battery;
    wherein the logic is configured to determine a current power consumption of the apparatus;
    wherein the logic is configured to determine whether the amount of remaining energy is sufficient to operate the apparatus for a duration of a predetermined time period based on the current power consumption of the apparatus;
    wherein the logic is configured to adjust the brightness of the display from the original level to a second level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus;
    wherein the logic further comprises logic to communicate with at least one other meeting participant for a scheduled meeting; and
    wherein the logic is further configured to send one of a group consisting of an email, a voice mail, a short message service message, and an instant message to the at least one other meeting participant responsive to determining the battery does not have sufficient energy to complete a scheduled meeting.

2. The apparatus set forth in claim 1, wherein the logic is further configured to adjust the brightness of the display based on a controllable amount of power consumption which is the difference between the current power consumption and a rate of power consumption by uncontrollable factors.

3. The apparatus set forth in claim 1, wherein the logic is further configured to periodically recalculate the amount of remaining energy in the battery and current power consumption.

4. The apparatus set forth in claim 1, further comprising a user interface;
    wherein the logic is further configured to adjust the brightness of the display to the original level responsive to detecting activity on the user interface; and
    wherein the logic is further configured to adjust the brightness of the display to the second level upon determining activity at the user interface has ceased.

5. The apparatus set forth in claim 1, wherein the logic is further configured to adjust the brightness of the display to the original level responsive to detecting another application executing; and
    wherein the logic is further configured to adjust the brightness of the display to the second level upon determining the another application has terminated.

6. The apparatus set forth in claim 1, further comprising an interface enabling the apparatus to communicate with at least one external device;
    wherein the logic further comprises logic for determining whether screen sharing is active with the at least one external device;

wherein the logic is further configured to adjust the brightness of the display to the original level responsive to determining screen sharing is active; and wherein the logic is further configured to adjust the brightness of the display to the second level responsive to determining screen sharing is completed.

7. The apparatus set forth in claim 1, further comprising a user interface;

wherein the logic is further configured to determine whether there is sufficient energy in the battery for a future scheduled event based on current consumption;

wherein the logic is further configured to output a message on the user interface responsive to determining that battery has insufficient energy for the future scheduled event; and wherein the logic is further configured to adjust the screen brightness to the second level prior to the future scheduled event responsive to an input received on the user interface.

8. The apparatus set forth in claim 7, wherein the logic further comprises a calendaring application; and wherein the logic obtains data for the future scheduled event from the calendaring application.

9. The apparatus set forth in claim 1, wherein the logic is further configured to adjust the brightness of the display to the original level responsive to determining the battery is charging.

10. The apparatus set forth in claim 1, wherein the logic is further configured to display a warning on the display responsive to determining that the remaining energy of the battery is insufficient for the duration of the predetermined time period after adjusting the display to the second level.

11. A method, comprising
determining an amount of remaining energy in a battery;
determining a current power consumption of an apparatus powered by the battery;
determining whether the amount of remaining energy is sufficient to operate the apparatus for a duration of a predetermined time period based on the current power consumption of the apparatus; and
adjusting the brightness of the display from an original level to a second level that is lower than the original level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus; and
sending one of a group consisting of an email, a voice mail, a short message service message, and an instant message to the at least one other meeting participant responsive to determining the battery does not have sufficient energy to complete a scheduled meeting.

12. The method of claim 11, further comprising:
determining a new application has been started;
adjusting the brightness of the display to the original level responsive to determining the new application has started;
determining that the new application has terminated; and
adjusting the brightness of the display to the second level responsive to determining the new application has terminated.

13. The method of claim 11, further comprising disabling a transceiver responsive determining the amount of energy is insufficient to operate the apparatus for the duration of the predetermined time period based on the current power consumption of the apparatus.

14. The method of clam 11, further comprising disabling one of a group consisting of an email application and an instant manager application responsive to determining the amount of energy is insufficient to operate the apparatus for the duration of the predetermined time period based on the current power consumption of the apparatus.

15. Logic encoded on at least one non-transitory medium and when executed operable to:
determine an amount of remaining energy in a battery;
determine a current power consumption rate of an apparatus powered by the battery;
determine whether the amount of remaining energy is sufficient to operate the apparatus for a remaining duration of a predetermined time period based on the current power consumption rate of the apparatus;
output data indicating that the amount of remaining energy is insufficient to operate the apparatus for the remaining duration of the predetermined time period based on the remaining energy in the battery and the current power consumption of the apparatus responsive to determining the amount of remaining energy is insufficient to operate the apparatus for the duration of the predetermined time period based on the current power consumption of the apparatus;
waiting for data to initiate a power save mode responsive to determining the amount of remaining energy is insufficient to operate the apparatus for the duration of the predetermined time period based on the current power consumption of the apparatus;
adjusting the brightness of the display from an original level to a second level that is lower than the original level to enable the device to operate for the duration of the predetermined time period based on the amount of remaining energy in the battery and the current power consumption of the apparatus responsive to receiving the data to initiate a power save mode
communicate with at least one other meeting participant for a scheduled meeting; and
send one of a group consisting of an email, a voice mail, a short message service message, and an instant message to the at least one other meeting participant responsive to determining the battery does not have sufficient energy to complete a scheduled meeting.

16. The logic of claim 15, wherein the logic is further operable to determine the predetermined time period from a calendaring application.

17. The logic of claim 15, wherein the logic is further operable to:
determine whether there is sufficient energy in the battery for a future scheduled event based on current consumption;
output data indicating that the battery has insufficient energy for the future scheduled event based on current consumption prior to the scheduled event; and
adjust the screen brightness to the second level prior to the future scheduled event responsive to receiving data to initiate a power save mode.

18. The logic of claim 15, further operable to extend a polling period for one of a group consisting of an email application and a calendaring application responsive to determining the amount of energy is insufficient to operate the apparatus for the duration of the predetermined time period based on the current power consumption of the apparatus.

19. An apparatus, comprising:
a battery;
a display having a brightness at an original level;
logic coupled to the battery and the display;
wherein the logic is configured to determine an amount of remaining energy in the battery;
wherein the logic is configured to determine a current power consumption of the apparatus;
wherein the logic is configured to determine whether the amount of remaining energy is sufficient to operate the apparatus for a duration of a predetermined time period based on the current power consumption of the apparatus;
wherein the logic is configured to adjust the brightness of the display from the original level to a second level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus;
wherein the logic further comprises logic to communicate with at least one other meeting participant for a scheduled meeting; and
wherein the logic is further configured to reschedule the scheduled meeting responsive to determining the battery does not have sufficient energy to complete a scheduled meeting.

20. A method, comprising
determining an amount of remaining energy in a battery;
determining a current power consumption of an apparatus powered by the battery;
determining whether the amount of remaining energy is sufficient to operate the apparatus for a duration of a predetermined time period based on the current power consumption of the apparatus; and
adjusting the brightness of the display from an original level to a second level that is lower than the original level to enable the device to operate for the duration of the predetermined time period based on the amount of remaining energy in the battery and the current power consumption of the apparatus responsive to determining the amount of remaining energy is insufficient to operate the apparatus for the duration of the predetermined time period based on the current power consumption of the apparatus;
rescheduling a scheduled meeting responsive to determining the battery does not have sufficient energy to complete a scheduled meeting; and
communicating with at least one other meeting participant for the scheduled meeting.

21. Logic encoded on at least one non-transitory medium and when executed operable to:
determine an amount of remaining energy in a battery;
determine a current power consumption rate of an apparatus powered by the battery;
determine whether the amount of remaining energy is sufficient to operate the apparatus for a remaining duration of a predetermined time period based on the current power consumption rate of the apparatus;
output data indicating that the amount of remaining energy is insufficient to operate the apparatus for the remaining duration of the predetermined time period based on the remaining energy in the battery and the current power consumption of the apparatus responsive to determining the amount of remaining energy is insufficient to operate the apparatus for the duration of the predetermined time period based on the current power consumption of the apparatus;
waiting for data to initiate a power save mode responsive to determining the amount of remaining energy is insufficient to operate the apparatus for the duration of the predetermined time period based on the current power consumption of the apparatus;
adjusting the brightness of the display from an original level to a second level that is lower than the original level to enable the device to operate for the duration of the predetermined time period based on the amount of remaining energy in the battery and the current power consumption of the apparatus responsive to receiving the data to initiate a power save mode
communicate with at least one other meeting participant for a scheduled meeting; and
reschedule the scheduled meeting responsive to determining the battery does not have sufficient energy to complete a scheduled meeting.

* * * * *